Patented May 13, 1952

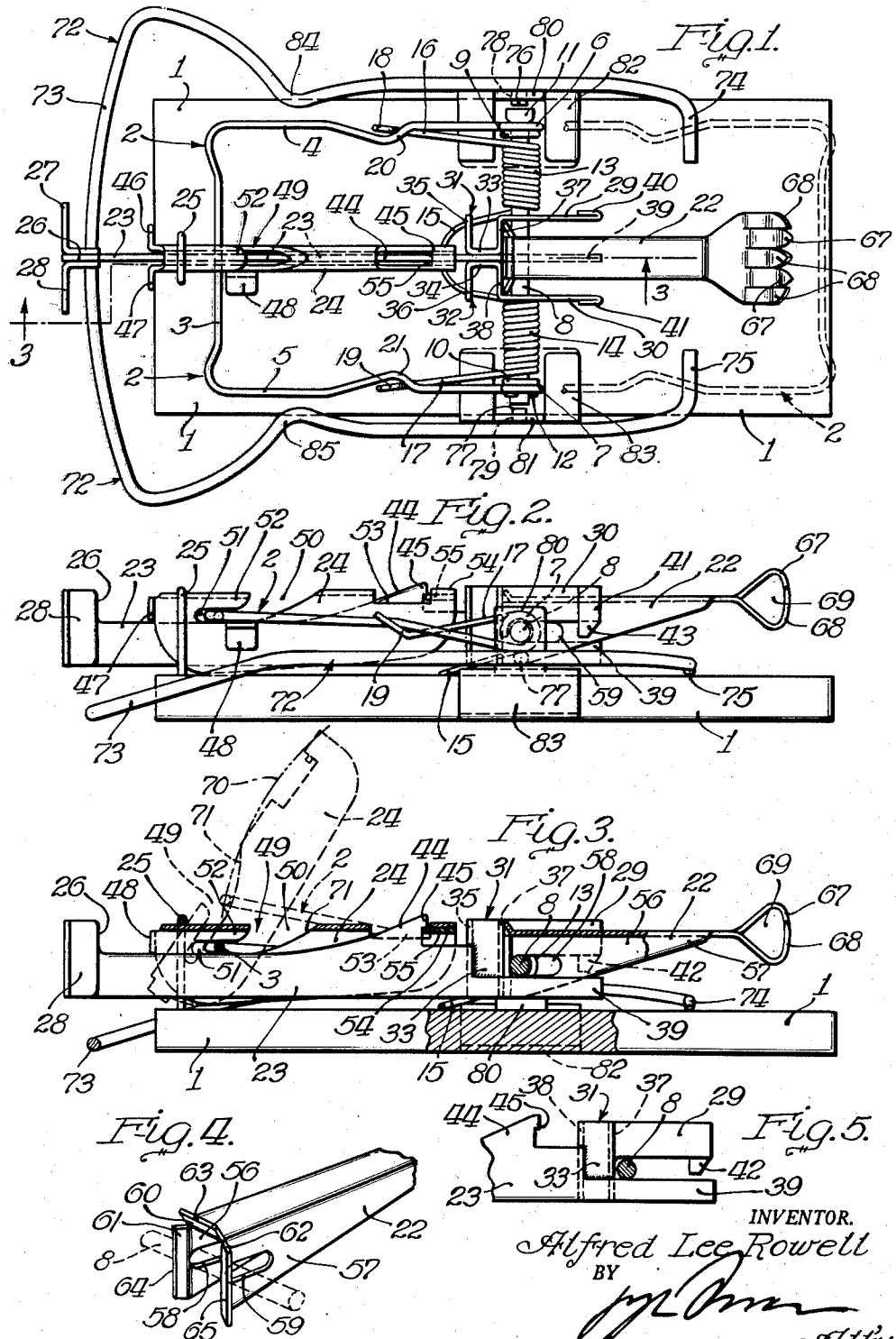

2,596,289

UNITED STATES PATENT OFFICE 2,596,289

ANIMAL TRAP

Alfred Lee Rowell, Chicago, Ill.

Application April 13, 1949, Serial No. 87,205

10 Claims. (Cl. 43—83.5)

This invention relates to animal traps and has been incorporated in a rat or mouse trap to illustrate its various features.

To produce an animal trap of optimum value, it is necessary to consider simplicity, sensitivity, sure catching characteristics under different conditions of approach, and last but not least the baiting and setting of the trap by an individual, which should be an easy, simple and safe chore.

It is an object of the present invention to produce a trap approaching as nearly as possible the above noted features and at the same time one that can be readily baited and set up with no danger of injury to the fingers or hand while so doing. The trap can be set or armed in such a manner that the fingers need not be brought within the operative active range of the animal-trapping bail.

Another object of the present invention is to produce a highly sensitive trap that is uniformly operable and wherein no particular precision is required either in the fabrication of the separate parts or in the trap assembly.

The above noted objects as well as other objects and features will appear from the following detailed description which is rendered below with reference to the accompanying drawings. In these drawings, Fig. 1 is a plan view of an embodiment of the invention, showing the combination of mechanisms of an animal trap in fully set and armed position;

Fig. 2 is a side elevational view of the trap in Fig. 1, with the parts all illustrated in armed position ready for a catch;

Fig. 3 is a longitudinal cross-sectional view of the trap taken in a vertical plane substantially along the line 3—3 in Fig. 1 and looking in the direction of the arrows;

Fig. 4 is a perspective view of a fragmentary portion of the bait arm of the trap; and Fig. 5 is a side elevational view of a fragmentary end portion of the trigger bar of the trap with a near side portion comprising a wing removed therefrom to show the construction thereof.

Like parts are indicated in the drawings by like reference numerals. Known elements will be discussed only to the extent required for supporting the understanding of the invention.

The trap mechanisms are operatively coordinated and carried upon a base 1 comprising the foundation and main supporting element of the trap. A generally U-shaped trapping bail 2 is provided having a cross arm 3 and legs 4 and 5, terminating in looped ends 6 and 7, respectively, which pivotally encircle the cross pin 8 held on base 1 by two staples 9 and 10. Endwise shifting of pin 8 is prevented by its head 11 and by the cotter pin 12.

The trapping bail 2 is biased for movement in clockwise direction about pin 8 (as seen in Figs. 2 and 3) by means of a spring carried upon the pin 8 and having left and right hand wound coils 13 and 14 connected by a common central loop 15 resting against the top surface of the base 1. Each coil 13 and 14 has a leg extension 16 and 17 having hook ends 18 and 19 for operative engagement with diagonal deformations 20 and 21 formed in the legs 4 and 5 of the trapping bail 2 at points remote from the cross pin 8.

The cooperative means for setting the trap by disposing the trapping bail 2 in armed position comprises three relatively movable parts of simple design but of highly sensitive interaction capable of springing the trap under the slightest touch by an animal from any direction of approach. These parts are the bait arm 22, the trigger bar 23 and the trigger lock bar or member 24 which functions to hold the trapping bail 2 in releasable position.

The movement of the trigger bar 23 is limited by the cross pin 8 and by the lock member 24 in coaction with a staple 25 fastened into the base 1. The bait arm 22 is connected pivotally and slidably with the cross pin 8, while the trigger lock member 24 is guided and held in operative relation to the trigger bar 23 by means of the staple 25.

The trigger bar 23 has an upturned outer or rear end 26 to which a pair of angles 27 and 28 are brazed or soldered to form a finger abutment used in setting the trap. The inner or forward end of the bar 23 is bifurcated horizontally, as seen in Fig. 1, by the addition of the offset wings 29 and 30 which are connected to bar 23 through the channel ends 31 and 32, respectively, by brazing or soldering the channel bases 33 and 34 to the bar 23. The free legs 35 and 36 reinforce this structure and provide abutments for the adjacent inner or forward end of the trigger lock member 24 as well as guide means to aid in repositioning the trigger lock member after springing of the trap. The other two legs 37 and 38 of the channels are co-planar and positioned at right angles to the bar 23 for coaction with the adjacent inner end of the bait arm 22. Although not shown, the lower ends of the free legs 35 and 36 are curved inwardly, in transverse direction, toward the longitudinal medial center line of the trap to avoid interference with the loop 15 of the trap spring coils 13 and 14.

As seen in Fig. 1, the lateral spacing of wings 29 and 30 is such that they are guided between the adjacent ends of the spring coils 13 and 14 to guide the bar 23 centrally of the trap at the pin 8.

Bar 23 is further bifurcated vertically as seen in Figs. 2, 3, and 5 by having the wings 29 and 30 arranged to ride above the pin 8 while bar 23 carries an extension 39 passing underneath the cross pin 8. In addition, the wings 29 and 30 terminate with folded ends 40 and 41 thus providing depending stops 42 and 43, respectively, to engage pin 8, preventing withdrawal of bar 23 from its designated position in combination with the other trap parts. Bar 23 is completed by an upward projection 44 intermediate its length ending in a vertical drop-off carrying the trap trigger 45 which faces in the direction of the channels 31 and 32.

The trigger lock bar 24 is an inverted U-shaped piece closed at spaced points across the top edge and arranged to straddle the bar 23 with its free legs flanking each side of the trigger bar. The lock bar 24 rides within staple 25 and also guides the bar 23 centrally at the staple by the interfitting arrangement of the two bars at the staple while the bar 23 acts to guide the free end of the lock bar 24 remotely from the staple keeping the parts aligned in the position shown in the drawings and also after the trap is sprung.

Lock bar 24 is maintained within the staple 25 and in operative relation to the trigger bar 23 by the lateral ears 46 and 47 adjacent the trap edge side of the staple and by means of the clip 48 secured to the lock bar at the opposite side of the staple 25.

A notch 49 is formed in the top of the lock bar 24 providing a flared opening 50 terminating in a horizontal channel 51 forming a hook 52 which is adapted to retain the cross arm 3 of the trapping bail 2 in preparatory position when the trap is armed as shown in Figs. 2 and 3. A second notch 53 is formed in the top at the forward or inner end of the locking bar 24 to provide a short connecting bridge 54. This bridge 54 has a latch plate 55 secured thereto which projects rearwardly into the notch 53 to engage under the trigger 45 of the trigger bar 23 when the parts are in armed relation holding the trapping bail 2 against springing until the trigger 45 and the latch plate 55 are separated. The pressure of the spring arm 3 upwardly against the hook 52 attempts to rotate the lock bar 24 counterclockwise into the dotted-line position shown in Fig. 3, but such displacement is prevented by the engagement of the rear edge of the latch plate 55 with the underside of the trigger 45, as shown in Figs. 1 and 2. The latch plate may be a hardened steel piece and the lock bar may be suitably treated to provide a hardened trigger 45. It should be observed that very little relative motion is necessary between the trigger 45 and the latch plate 55 to bring about springing of the trap.

Such relative movement between the parts just described is caused by angular displacement of the bait arm 22, in response to an animal attempting to steal the bait carried thereby. This arm 22 is made in the form of a channel with its open side facing downwardly, permitting the channel legs 56 and 57 to straddle the trigger bar projection 39. The legs 56 and 57 are slotted at 58 and 59, as shown in Fig. 4, to connect the bait arm 22 pivotally with the cross pin 8.

Each of the three channel walls at the slotted inner end of the bait arm 22 terminates in a flange 60, 61 and 62, respectively, disposed at an angle to the walls of the channel and so proportioned that the remote outer edges 63, 64 and 65 all lie in a common vertical plane abutting the adjacent surfaces of the legs 37 and 38 of the trigger bar channels 31 and 32. The side flanges 61 and 62 center the bait arm 22 by reaching outwardly substantially to each of the spaced wings 29 and 30 of the trigger bar 23, as seen in Fig. 1.

From the flanged construction of the inner end of the bait arm 22, as just described, and the position of the aligned slots 58 and 59 in relation to the flanges and substantially centrally vertically of the legs 56 and 57, it becomes apparent that any displacement of the arm 22 in any vertical, horizontal, transverse or diagonal direction about the fulcrum points, as determined by its spaced slotted ends in coaction with the cross pin 8, will transmit longitudinal rearward movement to the trigger bar 23 to separate the trigger 45 from the latch plate 55. Such displacement occurs when an animal approaches the trap, regardless from what direction, and attempts to steal the bait.

The free end of the bait arm 22 forms a number of upper and lower opposing teeth 67 and 68, respectively, leaving an open lateral passage 69 for the insertion of bait which may be pushed forwardly, partially between the opposing teeth to retain the bait while exposing it at each side of the bait arm and beyond the outer end thereof to tempt the animal into trapping position from all sides of the bait arm.

After baiting the trap properly it is a simple task to set it, which may be done by manually moving the trigger bar 23 and the lock bar 24 rearwardly, or by tilting the rear end of the trap down to allow all these parts to move rearwardly and outwardly by gravity from the rear end of the trap until the stops 42 and 43 catch the cross pin 8. In this position, the hook 52 of the lock bar is sufficiently retracted to place the flared opening 50 of the slot 49 in a position to receive the cross arm 3 of the trapping bail 2. The insertion is accomplished by rotating the bail against the pressure of springs 13 and 14 from the broken-line position in Fig. 1 to its full-line position. This may be done by moving the auxiliary setting bail 72 in a manner which will be presently described. When rotated into its full-line position, the cross arm 3 of the bail clears hook 52 and rests against the bottom of the slot 51 so that finger pressure upon the angles 27 and 28 moves the trigger bar 23 forwardly, thus moving its projection 44 against the latch plate 55 which is then in a position to engage under the trigger 45. Movement of these parts forwardly is stopped after the channel legs 37 and 38 have engaged the flanged inner end of the bait arm 22 and have moved the latter forwardly until the cross pin 8 is engaged by the rear ends of the slots 58 and 59 in the bait arm legs 56 and 57.

The trap bail 2 can be released as soon as the end of the hook 52 is over the cross arm 3. The latter then retards displacement of the lock bar to hold the latch plate 55 underneath and against the vertical edge of the trigger 45. The bail urges the lock bar in counter-clockwise direction, with the upper end of the staple 25 acting as a fulcrum whereby the latch bar engages tightly in operative latching relation under the trigger 45, to be held by the trigger. Since the latch bar also tends to lift the trigger bar 23, the latter is urged clockwise relative to the cross pin 8, causing the outer end of the bar 23 to contact the cross arm 3 of the bail from beneath to hold all these parts in latched relation under the tension of the bail. The sensitivity of the trap can thus be increased to prevent premature springing of the trap due to atmospheric or other inadvertent vibrations.

Since the various parts assume this latched and armed relation immediately after the bail is caught under the hook 52, further motion of the trigger bar 23 and lock bar 24 forwardly brings about the proper setting of the bait arm with its flanges 60, 61 and 62 in abutting contact with the described abutment surfaces of the trigger bar. After the parts are so positioned, as shown in the drawings, any slight movement of the bait arm 22 will cause rearward movement of the trigger bar 23 releasing the lock bar latch plate 55, causing the lock bar 24 to swing into the broken-line position in Fig. 3 to bring the open end of slot 49 into tangency with the path of movement of the cross arm 3 as indicated by the dash-and-dot arc 70.

The lock bar 24 does not interfere with the movement of the trapping bail since the former only occupies this raised position for an instant. The cross arm 3 of the bail immediately snaps the lock bar 24 back into horizontal position by contacting the curved edge 71 of the lock bar, producing a natural cam action which does not affect the total travel time of the bail from release to catching position upon the trap.

Another feature which makes this trap extremely sensitive, is that the trigger bar 23 and lock bar 24 and their respective fulcrums have been arranged to induce a greater friction between the cross arm 3 of the bail and hook 52 than between the trigger bar and the underside of the cross arm 3. By this frictional difference the bait arm 22 is able to move the trigger bar 23 without transferring any motion to the lock bar 24 and the latter is thus only positively sprung by separation of the trigger 45 from the latch plate 55 of the lock bar 24.

In addition to the mechanisms described, the trap further incorporates means for safely setting the trap without touching the bail and for removing a caught animal without touching it. This means comprises an auxiliary or release bail 72 having a handle 73 at one end and a pair of laterally inwardly turned ends 74 and 75 at the other end, which are normally positioned in the path of the bail 2, but in the clearance space beneath the same when it is sprung. This auxiliary bail 72 is pivotally mounted on the trap by means of the studs 76 and 77 which ride in appropriate aligned openings 78 and 79 in the upstanding lugs 80 and 81 of the brackets 82 and 83 secured to the opposite edges of the trap base 1. A pair of deformations 84 and 85 are provided intermediate the length of the legs of the bail 72 to snap over the upper edge of the trap base 1 resiliently when the inturned ends 74 and 75 are in contact with the surface of the trap base to hold the auxiliary bail rigid with the base while not in use.

After the trap is sprung a downward push of the thumbs against the bail handle 73, with the fingers positioned under the adjacent end of the trap base, will snap the bail loose from the base at the deformations 84 and 85 and cause the ends 74 and 75 to lift the trapping bail from the trapped animal to drop the latter from the trap.

By the use of the auxiliary bail 72 the trap bail 2 may be easily rotated for setting the trap due to the greater leverage of the bail 72. While thus rotating bail 2, the left end of the trap is simply held down to permit placing the cross arm 3 in slot 49 of the lock bar 24 and to subsequently move the trigger bar 23 endwise toward the cross pin 8 by finger pressure applied remotely from the trap base against the end angles 27 and 28 to engage the lock bar latch plate 55 and to set the trap after baiting it.

The foregoing description is directed to a preferred embodiment of the animal trap as disclosed in the drawings. Changes and modifications are, however, possible, and certain features of the invention may be useful in devices other than animal traps. The appended claims define what is believed to be new and desired to be protected by Letters Patent of the United States.

I claim:

1. An animal trap having a base, a spring-actuated trapping bail, a support for said bail carried by said base, and trap-springing means for releasably holding said bail in operative armed position comprising three cooperative elements arranged longitudinally of the trap base and in line with said bail support, one of said elements being longitudinally carried by said bail support and having a trigger, another of said elements being slidably carried by said first element and having a trigger latch, means on said base adapted to guide both of the trigger and trigger latch elements at a point remotely from said bail support, one of the aforesaid elements having hook means to retain said bail in armed position, and said third element having pivotal and slidable connection with said bail support and disposed for engagement with one of the other of said elements when the trap is armed to impart motion to said element separating the trigger and latch for releasing said hook means thereby springing the trap.

2. An animal trap comprising a base, a spring-actuated trapping bail, a support for said bail carried by said base, and means for releasably holding said bail in operative armed position comprising a trigger bar having one end slidably carried by said bail support, guide means on said base for guiding the other end of said trigger bar, a lock bar carried by said trigger bar and guided by said guide means, said lock bar having a hook disposed adjacent said staple to hold said bail, said bail normally urging said lock bar out of alignment with said trigger bar and in a direction to turn the hook at said staple to free said bail, cooperative trigger and latch means carried by said bars to counteract such rotative movement of said lock bar, and a bait carrier supported by said base and connected for operative engagement with one of said bars to cause release of said trigger and latch means upon movement of said bait carrier to spring the trap.

3. An animal trap comprising a base, a spring-actuated trapping bail, a support for said bail carried by said base, and means for releasably holding said bail in operative armed position comprising a trigger bar having one end slidably carred by said bail support, guide means on said base for guiding the other end of said trigger bar, a lock bar carried by said trigger bar and guided by said guide means, said lock bar having a hook disposed adjacent said staple to hold said bail in armed position, said bail normally urging said lock bar out of alignment with said trigger bar and in a direction to turn the hook at said staple to free said bail, cooperative trigger and latch means carried by said bars to counteract such rotative movement of said lock bar, and a bait carrier to spring said trap comprising a bait arm rockably and slidably mounted upon said bail support, said bait arm having one end facing one of said bars and presenting an abutment surface, and said trigger bar having a cooperative abutment surface adapted for coplanar engagement with the arm abutment surface whereby rockable motion of said arm in any direction will impart motion to said one bar to cause release of said trigger and latch means springing the trap.

4. A trigger release mechanism for animal traps having a trapping bail and biasing spring means therefor mounted upon a common base support, comprising a longitudinally movable trigger bar having one end movably carried by said base support, a longitudinally movable lock bar carried by said trigger bar, fixed retaining means to guide both of said bars at a point remote from said base support, said lock bar having a hook to hold said bail in armed position, said bail normally acting in said armed position to rotate said lock bar relative to said trigger bar with said fixed retaining means acting as a fulcrum, said trigger bar having a trigger thereon and said lock bar having a latch to engage said trigger, rotation of said lock bar being prevented by said trigger under the tension of said bail, said lock bar holding said bail against relative motion through the interaction of the aforesaid bar parts, and a bait carrier rockably mounted upon said base support and having operative engagement with said trigger bar to impart movement thereto relative to said lock bar until said bail is free from said hook to spring the trap.

5. A trigger release mechanism for animal traps having a base, a trapping bail, spring means for tensioning said bail, and a support on said base for carrying said bail and spring means, said trigger release mechanism comprising a longitudinally movable trigger bar having a trigger, one end of said trigger bar carrying an extension which is slidably mounted upon said support, retaining means on said base to guide the other end of said trigger bar, a lock bar having a latch, said lock bar being arranged to slide along said trigger bar and having one end thereof coacting with said retaining means for swinging movement out of alignment with said trigger bar, said lock bar having a hook to hold said spring-tensioned bail with the latter attempting to swing said lock bar away from said trigger bar, the trigger on said trigger bar engaging said latch to hold said lock bar against swinging movement and to impart an angular pressure to said trigger bar which operates to urge the extension thereof about its base support and its opposite end in pressure engagement with the underside of said bail thereby preventing longitudinal motion of said trigger bar while said lock bar holds said bail, and a bait carrier mounted on said base and having cooperative engagement with said trigger bar to positively move such bar longitudinally while the lock bar holds said bail until the trigger and latch separate to spring the trap.

6. An animal trap, a relatively stationary shaft, a trigger member carrying a trigger and having an extension forming a slot for sliding engagement with said shaft, a lock member carrying a latch for locking coaction with said trigger, said lock member being movably mounted on said trigger member and both trigger and lock members being movable as a unit, a bait arm disposed pivotally and slidably relative to said shaft, one end of said bait arm being disposed for engagement with the extension of said trigger member, and a spring-biased bail member having a cross-arm for engagement with said lock member to hold said trigger and lock members in coacting preparatory position, displacement of said bait arm causing displacement of said trigger member to disengage its trigger from the latch of said lock member for releasing said bail member to spring said trap.

7. The structure defined in claim 6, together with means for movably retaining said trigger and said latch members in coacting position.

8. The structure defined in claim 6, together with means extending from said trigger member for guiding coaction with said bait arm.

9. The structure defined in claim 6, wherein said bail member exerts pressure on said lock member to hold the extension of said trigger member in pressure engagement with said shaft.

10. The structure defined in claim 6, together with means carried by each said lock and said trigger members for limiting the displacement thereof.

ALFRED LEE ROWELL.

REFERENCES CITED

The following references are of record in the file of this patent:

UNITED STATES PATENTS

| Number | Name | Date |
|---|---|---|
| 2,059,119 | Korbisser | Oct. 27, 1936 |
| 2,100,926 | Stilson | Nov. 30, 1937 |
| 2,159,483 | Huebener | May 23, 1939 |
| 2,263,560 | Barrows | Nov. 25, 1941 |